United States Patent [19]

Kido et al.

[11] Patent Number: 4,750,037

[45] Date of Patent: Jun. 7, 1988

[54] NOISE REDUCTION SYSTEM FOR VIDEO SIGNAL

[75] Inventors: Koichi Kido, Yokosuka; Yasutoshi Matsuo, Kawasaki, both of Japan

[73] Assignee: Victor Company of Japan, Ltd., Yokohama, Japan

[21] Appl. No.: 915,816

[22] Filed: Oct. 6, 1986

[30] Foreign Application Priority Data

Oct. 7, 1985 [JP] Japan ................... 60-223161
Oct. 7, 1985 [JP] Japan ................... 60-223162

[51] Int. Cl.⁴ ............................................. H04N 5/21
[52] U.S. Cl. ..................................... 358/167; 358/36; 358/340
[58] Field of Search ............... 358/167, 166, 36, 340, 358/327

[56] References Cited

U.S. PATENT DOCUMENTS

| | | | |
|---|---|---|---|
| 4,485,399 | 11/1984 | Schulz | 358/167 |
| 4,575,760 | 3/1986 | Nakagaki et al. | 358/167 |
| 4,587,576 | 5/1986 | Hirota et al. | 358/340 |
| 4,607,285 | 8/1986 | Hirota et al. | 358/167 |
| 4,618,893 | 10/1986 | Hirota et al. | 358/167 |
| 4,626,927 | 12/1986 | Hirota et al. | 358/310 |

FOREIGN PATENT DOCUMENTS 0176888 4/1986 European Pat. Off. .
2481555 10/1981 France .

Primary Examiner—James J. Groody
Assistant Examiner—John K. Peng
Attorney, Agent, or Firm—Michael N. Meller

[57] ABSTRACT

A noise reduction system for reducing noise in a video signal comprises a pre-emphasis circuit for subjecting the video signal which is supplied to a transmission system to a pre-emphasis in a vertical direction of a picture and in a direction oblique to the vertical direction, and a de-emphasis circuit for subjecting the pre-emphasized video signal obtained through the transmission system to a de-emphasis complementary to the pre-emphasis.

15 Claims, 5 Drawing Sheets

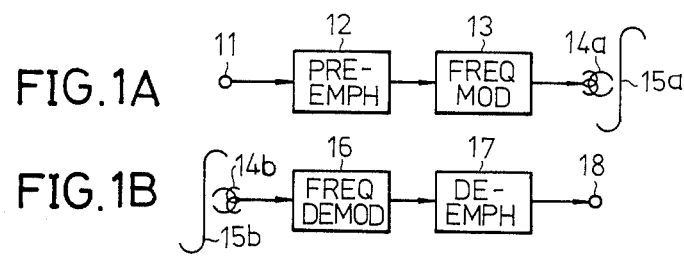
FIG.1A
FIG.1B
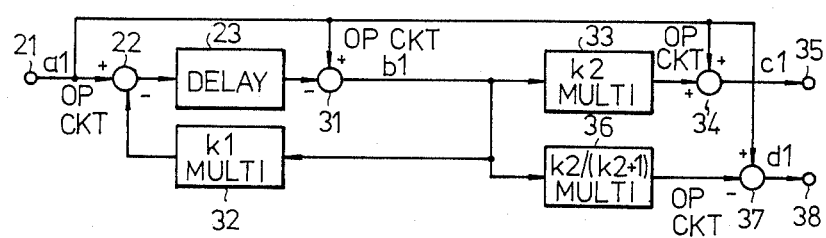
FIG. 2
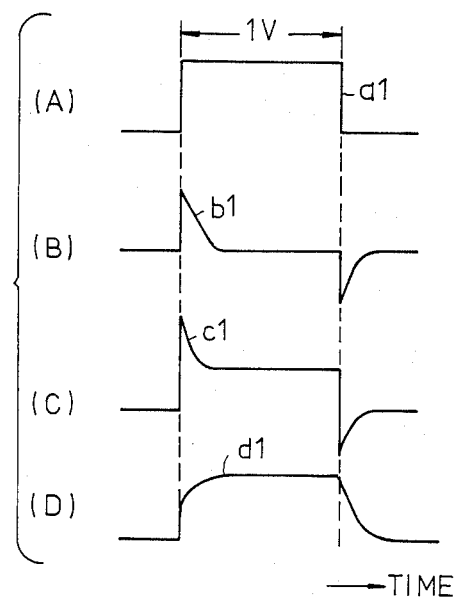
FIG. 3

HORIZONTAL SCANNING DIRECTION →

NOISE REDUCTION SYSTEM FOR VIDEO SIGNAL

BACKGROUND OF THE INVENTION

The present invention generally relates to noise reduction systems for video signals, and more particularly to a noise reduction system for reducing noise in a video signal which is recorded on and reproduced from a recording medium by subjecting a recording video signal to a pre-emphasis in a vertical direction of a picture and in a direction oblique to the vertical direction in a recording system at the time of a recording and by subjecting a reproduced video signal to a de-emphasis complementary to the pre-emphasis in a reproducing system at the time of a reproduction.

Conventionally, pre-emphasis and de-emphasis circuits are known for reducing noise in a video signal which is recorded on and reproduced from a recording medium. In a recording system, a recording video signal is subjected to a pre-emphasis in the pre-emphasis circuit, and a reproduced video signal is subjected to a de-emphasis in the de-emphasis circuit of a reproducing system. In the case of a frequency modulated video signal, the signal-to-noise (S/N) ratio is poor for high frequency components of the frequency modulated video signal. However, the pre-emphasis circuit can emphasize the high frequency components of the recording frequency modulated video signal before the recording. At the time of the reproduction, the de-emphasis circuit de-emphasizes (attenuates) the emphasized high frequency components of the reproduced frequency modulated video signal so as to obtain the original frequency modulated video signal. Therefore, it is possible to record and reproduce the high frequency components of the video signal with a satisfactory S/N ratio by use of such pre-emphasis and de-emphasis circuits. Transversal filters are generally used for the pre-emphasis and de-emphasis circuits.

According to one conventional noise reduction system, the emphasis is carried out by subtracting from or adding to an information which is related to a predetermined point on a predetermined horizontal scanning line in a reproduced picture a plurality of information related to a plurality of points which are on the predetermined horizontal scanning line and are positionally leading or lagging (advanced in time or lagging in time) with respect to the predetermined point. By carrying out such pre-emphasis and de-emphasis, it is possible to average high frequency noise in the horizontal direction of the picture, and it is accordingly possible to improve the S/N ratio of the video signal. In the present specification, such an emphasis will be referred to as a "horizontal emphasis".

According to the above described conventional noise reduction system, the noise can be reduced satisfactorily in the case where the noise is in the form of a vertical line which is long in the vertical direction of the picture and is narrow in the horizontal direction of the picture, for example. The noise can be reduced satisfactorily in this case because the frequency of the noise in the horizontal direction is high. On the other hand, in the case where the noise is in the form of a horizontal line which is long in the horizontal direction of the picture and is narrow in the vertical direction of the picture, the frequency of the noise in the horizontal direction is low. For this reason, the noise reducing effect is poor in this case, and there is a problem in that the noise in the form of the horizontal line cannot be reduced satisfactorily.

Hence, other noise reducing systems were previously proposed in a U.S. Pat. No. 4,607,285 and a U.S. patent application Ser. No. 634,407 filed July 25, 1984 (allowed but patent number not yet known) in which the assignee is the same as the assignee of the present application. According to these previously proposed noise reduction systems, the emphasis is carried out by subtracting from or adding to an information which is related to a predetermined point in a reproduced picture a plurality of information related to a plurality of points which are a specific number of horizontal scanning lines before the predetermined point. By carrying out such pre-emphasis and de-emphasis, it is possible to average high frequency noise in the vertical direction of the picture, and it is accordingly possible to improve the S/N ratio of the video signal. In the present specification, such an emphasis will be referred to as a "vertical emphasis".

According to the above described previously proposed noise reduction systems, the noise can be reduced satisfactorily in the case where the noise is in the form of a horizontal line which is long in the horizontal direction of the picture and is narrow in the vertical direction of the picture, for example. The noise can be reduced satisfactorily in this case because the frequency of the noise in the vertical direction is high. On the other hand, in the case where the noise is in the form of a vertical line which is long in the vertical direction of the picture and is narrow in the horizontal direction of the picture, the frequency of the noise in the vertical direction is low. For this reason, the noise reducing effect is poor in this case, and there is a problem in that the noise in the form of the vertical line cannot be reduced satisfactorily.

Generally, a noise reduction system of a magnetic recording and reproducing apparatus reduces the noise by assuming that the noise is random noise. However, the video signal recorded on the recording medium by the magnetic recording and reproducing apparatus has strong correlation in the horizontal direction of the picture and in the vertical direction of the picture. Furthermore, the video signal recorded on the recording medium also has strong correlation in terms of frames, that is, an information related to a predetermined point in the picture is correlated between successive frames. Accordingly, it may be regarded that the noise also has correlation.

For this reason, when the vertical emphasis is carried out in the previously proposed noise reduction systems, the noise becomes arranged in the vertical direction of the picture due to the correlation of the picture element data in the vertical direction of the picture, and the vertically arranged noise in the reproduced picture gives the viewer an impression as if it were raining. The viewer is used to seeing noise in the horizontal direction but is not used to seeing such noise in the vertical direction, and there is a problem in that such noise in the vertical direction is conspicuous to the viewer.

On the other hand, when designing the noise reduction system so as to improve the S/N ratio of the video signal, it is desirable that a recording medium recorded with the video signal on an existing magnetic recording and reproducing apparatus is compatibly playable on a magnetic recording and reproducing apparatus comprising the noise reduction system and vice versa.

SUMMARY OF THE INVENTION

Accordingly, it is a general object of the present invention to provide a novel and useful noise reduction system for video signal, in which the problems described heretofore are eliminated.

Another and more specific object of the present invention is to provide a noise reduction system for reducing noise in a video signal by subjecting the video signal which is supplied to a transmission system to a pre-emphasis in a vertical direction of a picture and in a direction oblique to the vertical direction and by subjecting the pre-emphasized video signal obtained through the transmission system to a de-emphasis complementary to the pre-emphasis. According to the noise reduction system of the present invention, it is possible to effectively scatter especially the noise having the correlation, and the S/N ratio of the reproduced video signal is improved.

Still another object of the present invention is to provide a noise reduction system for reducing noise in a video signal by subjecting the video signal which is supplied to a transmission system to a pre-emphasis and by subjecting the pre-emphasized video signal obtained through the transmission system to a de-emphasis, where a non-linear circuit is provided in at least one of a pre-emphasis circuit and a de-emphasis circuit which carries out the emphasis in a vertical direction of a picture and in a direction oblique to the vertical direction. According to the noise reduction system of the present invention, it is possible to effectively scatter especially the noise having the correlation, and the S/N ratio of the reproduced video signal is improved. Furthermore, a recording medium recorded with the video signal on an existing magnetic recording and reproducing apparatus is compatibly playable on a magnetic recording and reproducing apparatus comprising the noise reduction system of the present invention, and vice versa.

Other objects and further features of the present invention will be apparent from the following detailed description when read in conjunction with the accompanying drawings.

BRIEF DESCRIPTION OF THE DRAWINGS

FIGS. 1A and 1B are system block diagrams respectively showing a recording system and a reproducing system of a magnetic recording and reproducing apparatus applied with the noise reduction system according to the present invention;

FIG. 2 is a system block diagram showing a first embodiment of the noise reduction system according to the present invention;

FIGS. 3(A) through 3(D) show signal waveforms for explaining the operation of the block system shown in FIG. 2;

DETAILED DESCRIPTION

Figure 4:
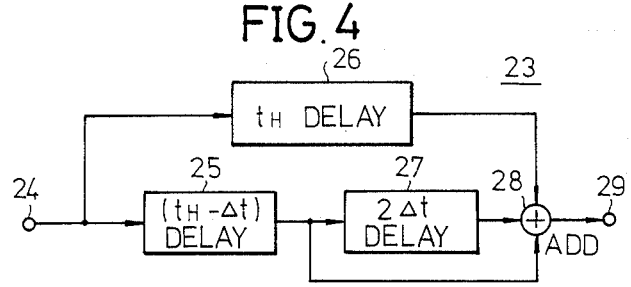
FIG. 4 is a system block diagram showing an embodiment of a delay circuit in the block system shown in FIG. 2.

A recording system and a reproducing system of a magnetic recording and reproducing apparatus applied with the noise reduction system according to the present invention are respectively shown in FIGS. 1A and 1B. In FIG. 1A, a video signal which is to be recorded is applied to an input terminal 11 and is supplied to a pre-emphasis circuit 12. As will be described later on in the present specification, the pre-emphasis circuit 12 subjects the video signal to a pre-emphasis in a vertical direction of a picture and in a direction oblique to the vertical direction at the time of a recording. A pre-emphasized video signal from the pre-emphasis circuit 12 is frequency-modulated in a frequency modulator 13, and the frequency modulated video signal is recorded on a magnetic tape 15a by a magnetic head 14a.

In FIG. 1B, a frequency modulated video signal is reproduced from a pre-recorded magnetic tape 15b by a magnetic head 14b. The pre-recorded magnetic tape 15b is recorded with the frequency modulated video signal in the recording system shown in FIG. 1A. The reproduced frequency modulated video signal is frequency-demodulated in a frequency demodulator 16 and is supplied to a de-emphasis circuit 17. As will be described later, the de-emphasis circuit 17 carries out a de-emphasis complementary to the pre-emphasis carried out at the time of the recording by subjecting the reproduced video signal to a de-emphasis in the vertical direction of the picture and in a direction oblique to the vertical direction at the time of the reproduction. The reproduced video signal from the de-emphasis circuit 17 is obtained via an output terminal 18. The signal transmission system is of course not limited to the magnetic tape.

FIG. 2 shows a first embodiment of the noise reduction system. The block system shown in FIG. 2 can function both as the pre-emphasis circuit 12 and the de-emphasis circuit 17 shown in FIGS. 1A and 1B. First, description will be given for the case where the block system functions as the pre-emphasis circuit 12. An input video signal is applied to an input terminal 21 and is supplied to a delay circuit 23 via an operation circuit 22. In the present embodiment, a luminance signal a1 shown in FIG. 3(A) is applied to the input terminal 21 as the input video signal. In FIG. 3(A), 1V denotes one vertical scanning period of the video signal.

FIG. 4 shows an embodiment of the delay circuit 23. The delay circuit 23 comprises delay lines 25, 26 and 27, and an adder 28. The luminance signal a1 obtained via the operation circuit 22 is applied to an input terminal 24 and is supplied to the delay lines 25 and 26. The delay line 25 has a delay time of $t_H - \Delta t$, where $t_H$ denotes the time of one horizontal scanning period and $\Delta t$ denotes a short time. Hence, the luminance signal a1 which is delayed by delay time $t_H - \Delta t$ in the delay line 25 is supplied to the adder 28 and to the delay line 27 which has a delay time of $2\Delta t$. The output delayed luminance signal of the delay line 27 is supplied to the adder 28. On the other hand, the luminance signal a1 is delayed by a delay time of $t_H$ (that is, one horizontal scanning period) in the delay line 26 and is supplied to the adder 28. The adder 28 adds the luminance signals which are respectively delayed by the delay times $t_H - \Delta t$, $t_H + \Delta t$ and $t_H$, and the output luminance signal of the adder 28 is supplied to an operation circuit 31 shown in FIG. 2 via an output terminal 29.

Figure 5:
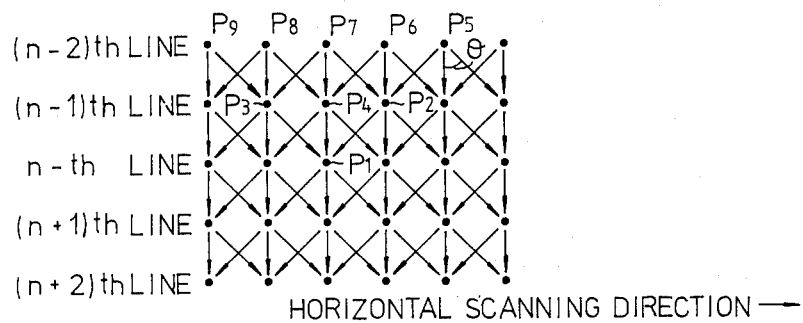
FIG. 5 is a diagram for explaining the noise reducing effect of the noise reduction system according to the present invention.

Accordingly, a signal related to a point P1 on an n-th scanning line shown in FIG. 5 is obtained by adding a signal which is related to a point P2 on a (n−1)th scanning line and is the time $t_H - \Delta t$ before the point P1, a signal which is related to a point P3 on the (n−1)th scanning line and is the time $t_H + \Delta t$ before the point P1. and a signal which is related to a point P4 on the (n−1)th scanning line and is the time $t_H$ before the point P1.

Returning now to the description of the block system shown in FIG. 1, the operation circuit 31 subtracts the output luminance signal of the delay circuit 23 from the luminance signal a1 and produces a signal b1 shown in FIG. 3(B). The signal b1 is multiplied by a coefficient k1 (for example, 0.5) in a coefficient multiplier 32 and an output signal of the coefficient multiplier 32 is supplied to the operation circuit 22. The operation circuit 22 subtracts the output signal of the coefficient multiplier 32 from the luminance signal a1, and supplies the resulting signal to the delay circuit 23.

On the other hand, the signal b1 is multiplied by a coefficient k2 (for example, 0.65) in a coefficient multiplier 33. An output signal of the coefficient multiplier 33 is supplied to an operation circuit 34 which adds the output signal of the coefficient multiplier 33 and the luminance signal a1 and produces a signal c1 shown in FIG. 3(C). This signal c1 is outputted via an output terminal 35 and is supplied to a transmission system (not shown). In the case of the recording system shown in FIG. 1A, this signal c1 is passed through the frequency modulator 13 and is recorded on the magnetic tape 15a by the magnetic head 14a.

As described before, the signal related to the point P1 on the n-th scanning line shown in FIG. 5 is obtained by adding the signals which are related to the points P2, P3 and P4 on the (n−1)th scanning line. In addition, the signal related to the point P4, for example, is obtained by adding signals which are related to points P6, P7 and P8 and are on a (n−2)th scanning line. In other words, the signal related to each point on a scanning line is affected by the signals related to points on the previous scanning lines. As a result, the level of high frequency components of the luminance signal a1 having spatial frequencies is emphasized as compared to low frequency components, where the emphasis is in the vertical direction of the picture and in the direction oblique to the vertical direction.

In one field, it takes approximately 180 nsec to scan in the horizontal direction a distance (interval) between two mutually adjacent horizontal scanning lines, for example. This time of 180 nsec is extremely short compared to $t_H$ which is 63.5 $\mu$sec. When the short time $\Delta t$ is set to 200 nsec, for example, the pre-emphasis carried out in the direction oblique to the vertical direction of the picture is such that an inclination angle $\theta$ shown in FIG. 5 is approximately 50°.

Next, description will be given for the case where the block system shown in FIG. 3 functions as the de-emphasis circuit 17. In this case, the output signal b1 of the operation circuit 31 is multiplied by a coefficient $k_2/(k_2+1)$ (for example, $0.65/(0.65+1) \approx 0.394$) in a coefficient multiplier 36. An output signal of the coefficient multiplier 36 is supplied to an operation circuit 37 which subtracts the output signal of the coefficient multiplier 37 from the luminance signal a1. In this case, the luminance signal a1 is the signal reproduced from the magnetic tape 15a by the magnetic head 14a shown in FIG. 1, for example. An output signal d1 of the operation circuit 37 shown in FIG. 3(D) is outputted via an output terminal 38.

According to the de-emphasis circuit 17, the level of the high frequency components of the luminance signal a1 having the spatial frequencies is de-emphasized (attenuated) as compared to the low frequency components, where the emphasis is in the vertical direction of the picture and in the direction oblique to the vertical direction. In other words, the de-emphasis circuit 17 carries out a de-emphasis complementary to the pre-emphasis carried out in the pre-emphasis circuit 12.

As may be seen by comparing FIGS. 3(C) and 3(D), the signals c and d have complementary characteristics. Hence, when the pre-emphasized luminance signal c1 is applied to the input terminal 21, the original luminance signal a1 shown in FIG. 3(A) is obtained from the output terminal 38. According to the present embodiment, the noise is scattered by the pre-emphasis and de-emphasis carried out in the vertical direction of the picture and in the direction oblique to the vertical direction as described heretofore in conjunction with FIG. 5, and it is thus possible to effectively reduce the undesirable effects of especially the noise having the correlation.

The improvement in the S/N ratio is substantially the same as the case where only the vertical emphasis is carried out when the coefficients k1 and k2 are equal to each other. However, by combining the vertical emphasis with the emphasis in the direction oblique to the vertical direction of the picture, it is possible to obtain a reproduced video signal having a satisfactory S/N ratio and to obtain a reproduced picture in which the noise is inconspicuous. According to the present embodiment, it is possible to effectively eliminate the so-called smear in the reproduced picture.

Figure 6:
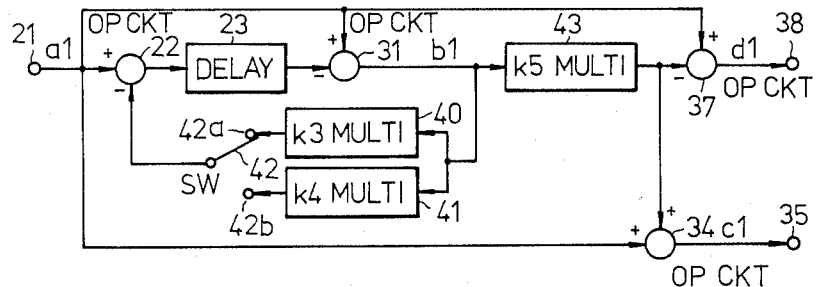
FIG. 6 is a system block diagram showing a second embodiment of the noise reduction system according to the present invention.

Next, description will be given with respect to a second embodiment of the noise reduction system by referring to FIG. 6. In FIG. 6, those parts which are the same as those corresponding parts in FIG. 2 are designated by the same reference numerals, and description thereof will be omitted. The block system shown in FIG. 6 can function both as the pre-emphasis circuit 12 and the de-emphasis circuit 17 shown in FIGS. 1A and 1B depending on the connection of a switch 42. For this reason, a large part of the block system can be used in common for the pre-emphasis circuit 12 and the de-emphasis circuit 17.

The switch 42 is connected to a terminal 42a when the block system shown in FIG. 6 is to function as the pre-emphasis circuit 12. The output signal b1 of the operation circuit 31 is supplied to coefficient multipliers 40 and 41 for multiplying coefficients k3 and k4, respectively, but only an output signal of the coefficient multiplier 40 is supplied to the operation circuit 22 via the switch 42. On the other hand, a coefficient multiplier 43 multiplies a coefficient k5 to the signal b1, and an output signal of the coefficient multiplier 43 is added to the luminance signal a1 in the operation circuit 34. The output signal c1 of the operation circuit 34 is outputted via the output terminal 35.

On the other hand, the switch 42 is connected to a terminal 42b when the block system is to function as the de-emphasis circuit 17. An output signal of the coefficient multiplier 41 is supplied to the operation circuit 22 via the switch 42. In addition, the coefficient multiplier 43 multiplies the coefficient k5 to the signal b1, and the output signal of the coefficient multiplier 43 is subtracted from the luminance signal a1 in the operation circuit 37. The output signal d1 of the operation circuit 37 is outputted via the output terminal 38.

Therefore, it is possible to obtain the pre-emphasized luminance signal from the output terminal 35 when the switch 42 is connected to the terminal 42a, and to obtain the de-emphasized (attenuated) luminance signal from the output terminal 38 when the switch 42 is connected to the terminal 42b.

Figure 7:
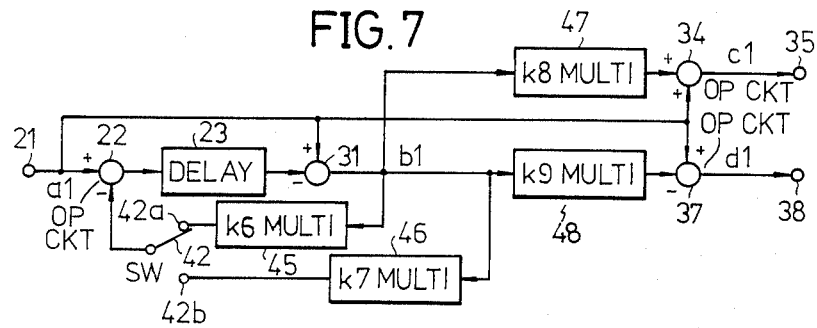
FIG. 7 is a system block diagram showing a third embodiment of the noise reduction system according to the present invention.

Next, description will be given with respect to a third embodiment of the noise reduction system by referring to FIG. 7. In FIG. 7, those parts which are the same as those corresponding parts in FIG. 6 are designated by the same reference numerals, and description thereof will be omitted.

When the block system shown in FIG. 7 functions as the pre-emphasis circuit 12, the output signal b1 of the operation circuit 31 is supplied to coefficient multipliers 45 and 46 for multiplying coefficients k6 and k7, respectively, but only an output signal of the coefficient multiplier 45 is supplied to the operation circuit 22 via the switch 42. On the other hand, a coefficient multiplier 47 multiplies a coefficient k8 to the signal b1, and an output signal of the coefficient multiplier 47 is added to the luminance signal a1 in the operation circuit 34. The output signal c1 of the operation circuit 34 is outputted via the output terminal 35.

On the other hand, when the block system functions as the de-emphasis circuit 17, an output signal of the coefficient multiplier 46 is supplied to the operation circuit 22 via the switch 42. In addition, a coefficient multiplier 48 multiplies a coefficient k9 to the signal b1, and an output signal of the coefficient multiplier 49 is subtracted from the luminance signal a1 in the operation circuit 37. The output signal d1 of the operation circuit 37 is outputted via the output terminal 38.

Figure 8:
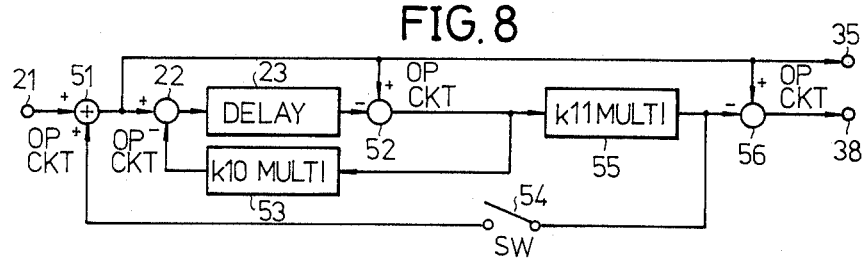
FIG. 8 is a system block diagram showing a fourth embodiment of the noise reduction system according to the present invention.

Next, description will be given with respect to a fourth embodiment of the noise reduction system by referring to FIG. 8. In FIG. 8, those parts which are the same as those corresponding parts in FIG. 2 are designated by the same reference numerals, and description thereof will be omitted. In the present embodiment, the block system functions as the pre-emphasis circuit 12 or the de-emphasis circuit 17 depending on the state of a switch 54.

The switch 54 is closed (turned ON) when the block system shown in FIG. 8 is to function as the pre-emphasis circuit 12. The luminance signal applied to the input terminal 21 is supplied to the delay circuit 22 via operation circuits 51 and 22. The output signal of the delay circuit 23 is subtracted from an output signal of the operation circuit 51 in an operation circuit 52, and an output signal of the operation circuit 52 is supplied to coefficient multipliers 53 and 55 for multiplying coefficients k10 and k11, respectively. The operation circuit 22 subtracts an output signal of the coefficient multiplier 53 from the output signal of the operation circuit 51, and the output signal of the operation circuit 22 is supplied to the delay circuit 23. On the other hand, an output signal of the coefficient multiplier 55 is supplied to the operation circuit 51 via the switch 54, and the operation circuit 51 adds the output signal of the coefficient multiplier 55 to the luminance signal from the input terminal 21. The operation circuit 51 supplies an added signal to the operation circuit 22 and to the output terminal 35.

On the other hand, the switch 54 is open (turned OFF) when the block system is to function as the de-emphasis circuit 17. In this case, the input signal to the operation circuit 51 is passed as it is and is supplied to the operation circuit 22. An operation circuit 56 subtracts the output signal of the coefficient multiplier 55 from the output signal of the adder 51 (that is, the luminance signal from the input terminal 21 in this case), and an output signal of the operation circuit 56 is supplied to the output terminal 38.

Therefore, it is possible to obtain the pre-emphasized luminance signal from the output terminal 35 when the switch 54 is closed, and to obtain the de-emphasized (attenuated) luminance signal from the output terminal 38 when the switch 54 is open.

Figure 9:
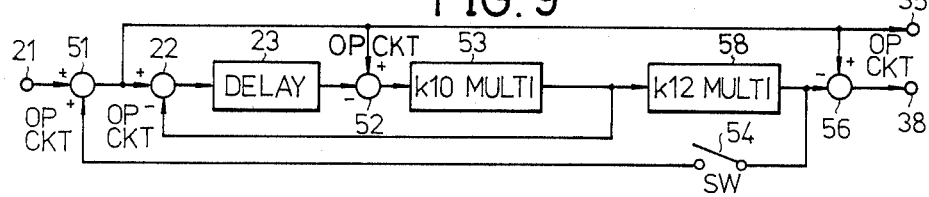
FIG. 9 is a system block diagram showing a fifth embodiment of the noise reduction system according to the present invention.

Next, description will be given with respect to a fifth embodiment of the noise reduction system by referring to FIG. 9. In FIG. 9, those parts which are the same as those corresponding parts in FIG. 8 are designated by the same reference numerals, and description thereof will be omitted. In the present embodiment, a coefficient multiplier 58 for multiplying a coefficient k12 is provided instead of the coefficient multiplier 55, and the coefficient multiplier 53 is provided between the output terminal of the operation circuit 52 and the input terminal of the coefficient multiplier 58.

When the switch 54 is closed, the output signal of the operation circuit 52 is supplied to the operation circuit 51 via the coefficient multipliers 53 and 58 and the switch 54. The coefficient k12 of the coefficient multiplier 58 is equal to k11/k10, and thus, the output signal of the operation circuit 52 is in effect multiplied by the coefficient $k11=k10\times k12$ by being passed through the coefficient multipliers 53 and 58. Accordingly, the operation of the present embodiment is basically the same as that of the fourth embodiment described before.

According to the first through fifth embodiments, the pre-emphasis and de-emphasis circuits employ a recursive filter comprising a delay circuit for independently delaying an input signal thereof by delay times $t_H - \Delta t$, $t_H + \Delta t$ and $t_H$ and for adding the delayed signals. As a result, the pre-emphasis and de-emphasis are carried out both in the vertical dirction of the picture and the direction oblique to the vertical direction, where the inclination angle $\theta$ of the emphasis carried out in the direction oblique to the vertical direction is such that $0° \leq \theta \leq 90°$. Therefore, the noise is effectively scattered, and it is possible to obtain a reproduced picture in which the noise having the correlation is essentially eliminated.

Figure 10:
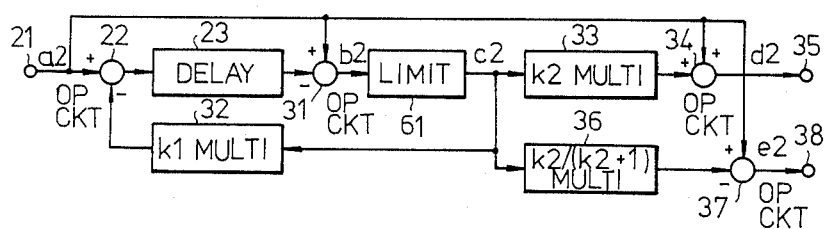
FIG. 10 is a system block diagram showing a sixth embodiment of the noise reduction system according to the present invention.

Next, description will be given with respect to a sixth embodiment of the noise reduction system by referring to FIG. 10. In FIG. 10, those parts which are the same as those corresponding parts in FIG. 2 are designated by the same reference numerals, and description thereof will be omitted. The present embodiment differs from the first embodiment in that a limiter 61 is provided between the output terminal of the operation circuit 31 and a connection point of the coefficient multipliers 32, 33 and 36.

Figure 11:
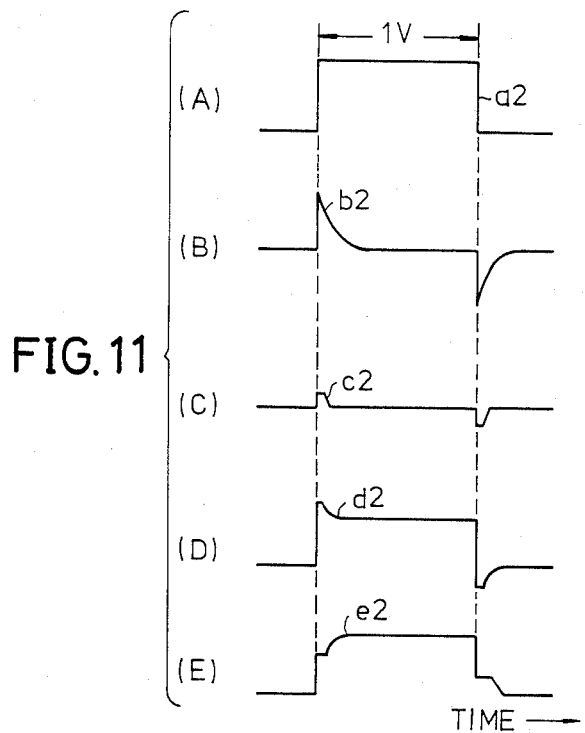
FIGS. 11(A) through 11(E) show signal waveforms for explaining the operation of the block system shown in FIG. 10.

First, description will be given for the case where the block system shown in FIG. 10 functions as a non-linear pre-emphasis circuit. In this case, a luminance signal a2 shown in FIG. 11(A) is applied to the input terminal 21 and a signal b2 shown in FIG. 11(B) is obtained from the operation circuit 31. The signals a2 and b2 are respectively identical to the signal a1 and b1 described before. The signal b2 is suppled to the limiter 61 having a predetermined amplitude (level) limiting characteristic and is formed into a signal c2 shown in FIG. 11(C). This signal c2 is supplied to the coefficient multipliers 32 and 33. Hence, a signal d2 shown in FIG. 11(D) is obtained from the operation circuit 34 and is outputted via the output terminal 35.

On the other hand, when the block system functions as a non-linear de-emphasis circuit, the signal c2 is supplied to the operation circuit 37 via the coefficient multiplier 36. Accordingly, a signal e2 shown in FIG. 11(E) is obtained from the operation circuit 37 and is outputted via the output terminal 38. As may be seen by comparing FIGS. 11(D) and 11(E), the signals d2 and e2 have complementary characteristics. Hence, when the pre-emphasized luminance signal d2 is applied to the input terminal 21, the original luminance signal a2 shown in FIG. 11(A) is obtained from the output terminal 38. According to the present embodiment, the noise is scattered by the non-linear pre-emphasis and de-emphasis carried out in the vertical direction of the picture and in the direction oblique to the vertical direction as described before in conjunction with FIG. 5, and it is thus possible to effectively reduce the undesirable effects of especially the noise having the correlation.

Other non-linear circuits may be used in place of the limiter 61. In addition, in the case of a magnetic recording and reproducing apparatus (hereinafter referred to as a video tape recorder or simply VTR) comprising the non-linear de-emphasis circuit, the level of the video signal is not attenuated to a great extent during the reproduction. For this reason, it is possible to reproduce the original signal waveform without any problem from the practical point of view when the video signal is reproduced on the VTR comprising the non-linear de-emphasis circuit from a pre-recorded magnetic tape which has been recorded on the existing VTR (having a pre-emphasis circuit for carrying out only a horizontal pre-emphasis, for example) having no non-linear pre-emphasis circuit. On the other hand, the level of the video signal is not emphasized to a great extent during the recording on a VTR comprising the non-linear pre-emphasis circuit. Hence, it is possible to reproduce the original signal waveform without any problem from the practical point of view when the video signal is reproduced on the existing VTR (having a de-emphasis circuit for carrying out only a horizontal de-emphasis, for example) having no non-linear de-emphasis circuit from a pre-recorded magnetic tape which has been recorded on the VTR comprising the non-linear pre-emphasis circuit.

Therefore, in the present embodiment and in seventh through tenth embodiments which will be described later, it is possible to provide only one of the non-linear pre-emphasis circuit and the non-linear de-emphasis circuit in the noise reduction system and still maintain compatibility of the pre-recorded magnetic tape which has been recorded on the existing VTR and the pre-recorded magnetic tape which has been recorded on the VTR comprising the noise reduction system of the present invention. In other words, the two kinds of pre-recorded magnetic tapes are compatibly playable on the existing VTR and the VTR comprising one of the non-linear pre-emphasis circuit and the non-linear de-emphasis circuit.

Figure 12:
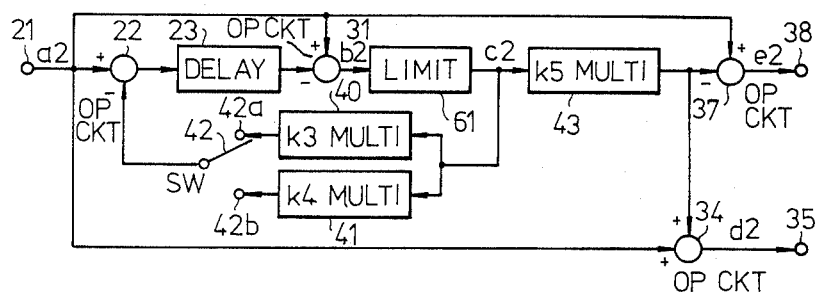
FIG. 12 is a system block diagram showing a seventh embodiment of the noise reduction system according to the present invention.

Next, description will be given with respect to a seventh embodiment of the noise reduction system by referring to FIG. 12. In FIG. 12, those parts which are the same as those corresponding parts in FIG. 6 are designated by the same reference numerals, and description thereof will be omitted. In the present embodiment, the limiter 61 is provided between the output terminal of the operation circuit 31 and a connection point of the coefficient multipliers 40, 41 and 43, and the output signal c2 of the limiter 61 is supplied to the coefficient multipliers 40 and 41.

Figure 13:
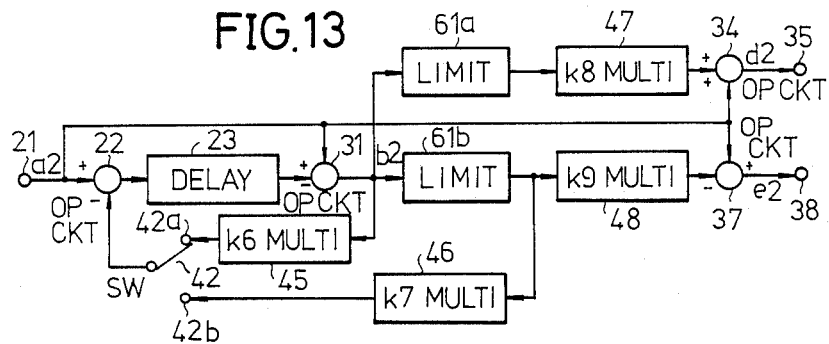
FIG. 13 is a system block diagram showing an eighth embodiment of the noise reduction system according to the present invention.

FIG. 13 shows an eighth embodiment of the noise reduction system. In FIG. 13, those parts which are the same as those corresponding parts in FIG. 7 are designated by the same reference numerals, and description thereof will be omitted. In the resent embodiment, a limiter 61a is provided between the output terminal of the operation circuit 31 and the input terminal of the coefficient multiplier 47, and a limiter 61b is provided between the output terminal of the operation circuit 31 and the input terminal of the coefficient multiplier 48. An output signal of the limiter 61b is supplied to the coefficient multiplier 46.

Figure 14:
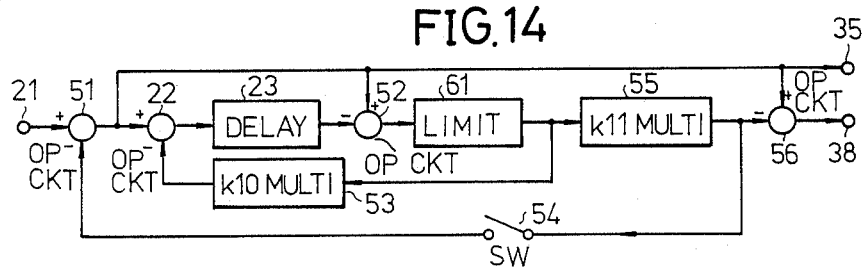
FIG. 14 is a system block diagram showing a ninth embodiment of the noise reduction system according to the present invention.

Next, description will be given with respect to a ninth embodiment of the noise reduction system by referring to FIG. 14. In FIG. 14, those parts which are the same as those corresponding parts in FIG. 8 are designated by the same reference numerals, and description thereof will be omitted. In the present embodiment, the limiter 61 is provided between the output terminal the operation circuit 52 and the input terminal of the coefficient multiplier 55, and the output signal of the limiter 61 is supplied to the coefficient multiplier 53.

Figure 15:
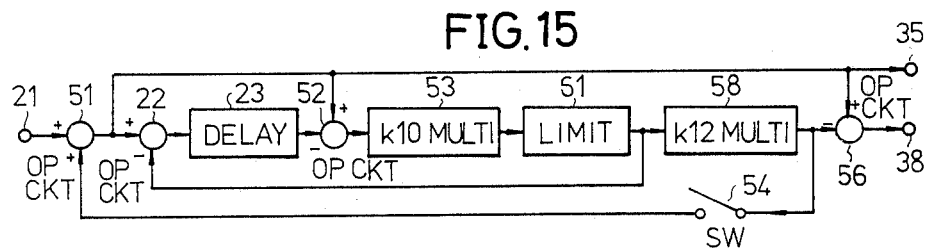
FIG. 15 is a system block diagram showing a tenth embodiment of the noise reduction system according to the present invention.

FIG. 15 shows a tenth embodiment of the noise reduction system. In FIG. 15, those parts which are the same as those corresponding parts in FIG. 9 are designated by the same reference numerals, and description thereof will be omitted. In the present embodiment, the limiter 61 is provided between the output terminal of the coefficient multiplier 53 and the input terminal of the coefficient multiplier 58, and the output signal of the limiter 61 is supplied to the operation circuit 22.

According to the sixth through tenth embodiments, the non-linear pre-emphasis and de-emphasis circuits employ a non-linear circuit and a recursive filter comprising a delay circuit for independently delaying an input signal thereof by delay times $t_H - \Delta t$, $t_H + \Delta t$ and $t_H$ and for adding the delayed signals. The non-linear emphasis quantity may be varied depending on the level of the input video signal. As a result, the non-linear pre-emphasis and de-emphasis are carried out both in the vertical direction of the picture and in the direction oblique to the vertical direction, where the inclination angle $\theta$ of the non-linear emphasis carried out in the direction oblique to the vertical direction is such that $0°\leq\theta\leq 90°$. Therefore, the noise is effectively scattered, and it is possible to obtain a reproduced picture in which the noise having the correlation is essentially eliminated. In addition, it is possible to achieve the magnetic tape compatibility with the existing VTR.

In each of the embodiments described heretofore, the combination of the operation circuits and the coefficient multipliers may be appropriately modified according to the needs, that is, depending on the inclination angle $\theta$ of the emphasis carried out in the direction oblique to the vertical direction of the picture and the like.

Further, the present invention is not limited to these embodiments, but various variations and modifications may be made without departing from the scope of the present invention.

What is claimed is:

1. A noise reduction system for a video signal, said noise reduction system comprising:
   pre-emphasis means supplied with an input video signal which is to be transmitted for supplying an output signal to a transmission system, said pre-emphasis means having a characteristic for relatively emphasizing the level of high frequency components of the input video signal having spatial frequencies, the emphasis being in a vertical direction of a picture and in a direction oblique to the vertical direction as compared to low frequency components of the input video signal, said pre-emphasis means comprising a first loop circuit supplied with the input video signal for repeatedly circulating the input video signal, said first loop circuit subjecting the input video signal to a predetermined delay time and to a first loop gain per one cycle; and
   de-emphasis means supplied with the video signal which has been pre-emphasized in said pre-emphasis means and which has been transmitted through the transmission system, said de-emphasis means having a characteristic for relatively attenuating the level of the high frequency components of the pre-emphasized video signal having the spatial frequencies, the attenuation being in the vertical direction of the picture and in the direction oblique to the vertical direction as compared to the low frequency components of the pre-emphasized video signal, said de-emphasis means comprising a second loop circuit supplied with the video signal obtained through the transmission system for repeatedly circulating the obtained video signal, said second loop circuit subjecting the obtained video signal to said predetermined delay time and to a second loop gain per one cycle,
   at least one of said first and second loop circuits comprising a delay circuit for providing said predetermined delay time, said delay circuit comprising a first delay line for delaying an input signal by a delay time $t_H-\Delta t$, a second delay line for delaying the input signal by a delay time $t_H$, a third delay line for delaying an output signal of said first delay line by a delay time $2\Delta t$, and an adding circuit for adding output signals of said first through third delay lines so as to obtain the signal delayed by said predetermined delay time, where $t_H$ denotes a time of one horizontal scanning period of the video signal and $\Delta t$ denotes a short time,
   the characteristics of said pre-emphasis means and said de-emphasis means cooperating so as to reduce noise in the input video signal.

2. A noise reduction system as claimed in claim 1 in which said pre-emphasis means comprises a first operation circuit for adding substantially a video signal derived from said first loop circuit and multiplied by a first coefficient and the input video signal to get the output signal of said pre-emphasis means, and said de-emphasis means comprises a second operation circuit for substracting substantially a video signal derived from said second loop circuit and multiplied by a second coefficient from the obtained video signal to get the output signal of said de-emphasis means.

3. A noise reduction system as claimed in claim 1 in which a single loop circuit is included in common in said first and second loop circuits, said first and second loop gains being equal to each other.

4. A noise reduction system for a video signal, said noise reduction system comprising:
   pre-emphasis means supplied with an input video signal which is to be transmitted for supplying an output signal to a transmission system, said pre-emphasis means having a characteristic for relatively emphasizing the level of high frequency components of the input video signal having spatial frequencies, the emphasis being in a vertical direction of a picture and in a direction oblique to the vertical direction as compared to low frequency components of the input video signal, said pre-emphasis means comprising a first loop circuit supplied with the input video signal for repeatedly circulating the input video signal, said first loop circuit subjecting the input video signal to a predetermined delay time and to a first loop gain per one cycle, and a first operation circuit for adding subsantially a video signal derived from said first loop circuit and multiplied by a first coefficient and the input video signal to get the output signal of said pre-emphasis means; and
   de-emphasis means supplied with the video signal which has been pre-emphasized in said pre-emphasis means and which has been transmitted through the transmission system, said de-emphasis means having a characteristic for relatively attenuating the level of the high frequency components of the pre-emphasized video signal having the spatial frequencies, the attenuation being in the vertical direction of the picture and in the direction oblique to the vertical direction as compared to the low frequency components of the pre-emphasized video signal, said de-emphasis means comprising a second loop circuit supplied with the video signal obtained through the transmission system for repeatedly circulating the obtained video signal, said second loop circuit subjecting the obtained video signal to said predetermined delay time and to a second loop gain per one cycle, and a second operation circuit for substracting substantially a video signal derived from said second loop circuit and multiplied by a second coefficient from the obtained video signal to get the output signal of said de-emphasis means, the
   characteristics of said pre-emphasis means and said de-emphasis means cooperating so as to reduce noise in the input video signal, a single loop circuit being included in common in said first and second loop circuits, said single loop circuit comprising first and second coefficient multipliers supplied in parallel with the signal subjected to said predetermined delay time and a switch for selectively circulating output signals of said first and second coefficient multipliers depending on whether said single loop circuit is used for said pre-emphasis means or said de-emphasis means, said first and second coefficient multipliers respectively multiplying third and fourth coefficients so as to provide said first and second loop gains which are mutually different, said first and second coefficients being equal to each other.

5. A noise reduction system for a video signal, said noise reduction system comprising:

pre-emphasis means supplied with an input video signal which is to be transmitted for supplying an output signal to a transmission system, said pre-emphasis means having a characteristic for relatively emphasizing the level of high frequency components of the input video signal having spatial frequencies, the emphasis being in a vertical direction of a picture and in a direction oblique to the vertical direction as compared to low frequency components of the input video signal, said pre-emphasis means comprising a first loop circuit supplied with the input video signal for repeatedly circulating the input video signal, said first circuit subjecting the input video signal to a predetermined delay time and to a first loop gain per one cycle, and a first operation circuit for adding substantially a video signal derived from said first loop circuit and multiplied by a first coefficient and the input video signal to get the output signal of said pre-emphasis means; and de-emphasis means supplied with the video signal which has been pre-emphasized in said pre-emphasis means and which has been transmitted through the transmission system, said de-emphasis means having a characteristic for relatively attenuating the level of the high frequency componenets of the pre-emphasized video signal having the spatial frequencies, the attenuation being in the vertical direction of the picture and in the direction oblique to the vertical direction as compared to the low frequency components of the pre-emphasized video signal, said de-emphasis means comprising a second loop circuit supplied with the video signal obtained through the transmission system for repeatedly circulating the obtained video signal, said second loop circuit subjecting the obtained video signal to said predetermined delay time and to a second loop gain per one cycle, and a second operation circuit for subtracting substantially a video signal derived from said second loop circuit and multiplied by a second coefficient from the obtained video signal to get the output signal of said de-emphasis means, the characteristics of said pre-emphasis means and said de-emphasis means cooperating so as to reduce noise in the input video signal, a single loop circuit being included in common in said first and second loop circuits, said single loop circuit comprising first and second coefficient multipliers supplied in parallel with the signal subjected to said predetermined delay time and a switch for selectively circulating output signals of said first and second coefficient multipliers depending on whether said single loop circuit is used for said pre-emphasis means or said de-emphasis means, said first and second coefficient multipliers respectively multiplying third and fourth coefficients so as to provide said first and second loop gains which are mutually different, said first and second coefficients being mutually different.

6. A noise reduction system for a video signal, said noise reduction system comprising:

pre-emphasis means supplied with an input video signal which is to be transmitted for supplying an output signal to a transmission system, said pre-emphasis means having a characteristic for relatively emphasizing the level of high frequency components of the input video signal having spatial frequencies, the emphasis being in a vertical direction of a picture and in a direction oblique to the vertical direction as compared to low frequency components of the input video signal, said pre-emphasis means comprising a first loop circuit supplied with the input video signal for repeatedly circulating the input video signal, said first loop circuit subjecting the input video signal to a predetermined delay time and to a first loop gain per one cycle, and a first operation circuit for adding substantially a video signal derived from said first loop circuit and multiplied by a first coefficient and the input video signal to get the output signal of said pre-emphasis means; and de-emphasis means supplied with the video signal which has been pre-emphasized in said pre-emphasis means and which has been transmitted through the transmission system, said de-emphasis means having a characteristic for relatively attenuating the level of the high frequency components of the pre-emphasized video signal having the spatial frequencies, the attenuation being in the vertical direction of the picture and in the direction oblique to the vertical direction as compared to the low frequency components of the pre-emphasized video signal, said de-emphasis means comprising a second loop circuit supplied with the video signal obtained through the transmission system for repeatedly circulating the obtained video signal, said second loop circuit subjecting the obtained video signal to said predetermined delay time and to a second loop gain per one cycle, and a second operation circuit for subtracting substantially a video signal derived from said second loop circuit and multiplied by a second coefficient from the obtained video signal to get the output signal of said de-emphasis means, said first and second coefficients being equal to each other, the characteristics of said pre-emphasis means and said de-emphasis means cooperating so as to reduce noise in the input video signal.

7. A noise reduction system as claimed in claim 6 in which a single loop circuit is included in common in said first and second loop circuits, said first and second loop gains being equal to each other.

8. A noise reduction system as claimed in claim 7 in which said single loop circuit comprises a delay circuit for providing said predetermined delay time, said delay circuit comprising a first delay line for delaying an input signal by a delay time $t_H - \Delta t$, a second delay line for delaying the input signal by a delay time $t_H$, a third delay line for delaying an output signal of said first delay line by a delay time $2\Delta t$, and an adding circuit for adding output signals of said first through third delay lines so as to obtain the signal delayed by said predetermined delay time, where $t_H$ denotes a time of one horizonatl scanning period of the video signal and $\Delta t$ denotes a short time.

9. A noise reduction system as claimed in claim 7 in which said first operation circuit is provided at an input stage of said single loop circuit, and there is further provided a switch for supplying to said first operation circuit the signal multiplied by said first coefficient so that said first operation circuit adds the input video signal and the signal from said switch, said switch being open when said single loop circuit is used for said de-emphasis means.

10. A noise reduction system for a video signal, said noise reduction system comprising:

pre-emphasis means supplied with an input video which is to be transmitted for supplying an output signal to a transmission system, said pre-emphasis means having a characteristic for relatively emphasizing the level of high frequency components of the input video signal having spatial frequencies, the emphasis being at least in a horizontal direction of a picture as compared to low frequency components of the input video signal; and de-emphasis means supplied with the video signal which has been pre-emphasized in said pre-emphasis means and which has been transmitted through the transmission system, said de-emphasis means having a characteristic for relatively attenuating the level of the high frequency components of the pre-emphasized video signal having the spatial frequencies, the attenuation being in a vertical direction of the picture and in a direction oblique to the vertical direction as compared to the low frequency components of the pre-emphasized video signal, said de-emphasis means comprising a loop circuit supplied with the video signal obtained through the transmission system for repeatedly circulating the obtained video signal, said loop circuit subjecting the obtained video signal to a predetermined delay time and to a loop gain per one cycle, and an operation circuit for subtracting substantially a video signal derived from said loop circuit and multiplied by a coefficient from the obtained video signal to get the output signal of said de-emphasis means, said loop circuit including a non-linear circuit for limiting the level of a signal supplied thereto, the characteristics of said pre-emphasis means and said de-emphasis means cooperating so as to reduce noise in the input video signal.

11. A noise reduction system as claimed in claim 10 in which said loop circuit comprises a delay circuit for providing said predetermined delay time, said delay circuit comprising a first delay line for delaying an input signal by a delay time $t_H - \Delta t$, a second delay line for delaying the input signal by a delay time $t_H$, a third delay line for delaying an output signal of said first delay line by a delay time $2\Delta t$, and an adding circuit for adding output signals of said first through third delay lines so as to obtain the signal delayed by said predetermined delay time, where $t_H$ denotes a time of one horizontal scanning period of the video signal and $\Delta t$ denotes a short time.

12. A noise reduction system as claimed in claim 10 in which said pre-emphasis means comprises another non-linear circuit for limiting the level of the input video signal.

13. A noise reduction system for a video signal, said noise reduction system comprising:

pre-emphasis means supplied with an input video signal which is to be transmitted for supplying an output signal to a transmission system, said pre-emphasis means having a characteristic for relatively emphasizing the level of high frequency components of the input video signal having spatial frequencies, the emphasis being in a vertical direction of a picture and in a direction oblique to the vertical direction as compared to low frequency components of the input video signal; and de-emphasis means supplied with the video signal which has been pre-emphasized in said pre-emphasis means and which has been transmitted through the transmission system, said de-emphasis means having a characteristic for relatively attenuating the level of the high frequency components of the pre-emphasized video signal having the spatial frequencies, the attenuation being at least in a horizontal direction of the picture as compared to the low frequency components of the pre-emphasized video signal, said pre-emphasis means comprising a loop circuit supplied with the input video signal for repeatedly circulating the input video signal, said loop circuit subjecting the input video signal to a predetermined delay time and to a loop gain per one cycle, and an operation circuit for adding substantially a video signal derived from said loop circuit and multiplied by a coefficient and the input video signal to get the output signal of said pre-emphasis means, said pre-emphasis means including a non-linear circuit for limiting the level of a signal supplied thereto, the characteristics of said pre-emphasis means and said de-emphasis means cooperating so as to reduce noise in the input video signal.

14. A noise reduction system as claimed in claim 13 in which said loop circuit comprises a delay circuit for providing said predetermined delay time, said delay circuit comprising a first delay line for delaying an input signal by a delay time $t_H - \Delta t$, a second delay line for delaying the input signal by a delay time $t_H$, a third delay line for delaying an output signal of said first delay line by a delay time $2\Delta t$, and an adding circuit for adding output signals of said first through third delay lines so as to obtain the signal delayed by said predetermined delay time, where $t_H$ denotes a time of one horizontal scanning period of the video signal and $\Delta t$ denotes a short time.

15. A noise reduction system as claimed in claim 13 in which said de-emphasis means comprises another loop circuit supplied with the video signal obtained through the transmission system for repeatedly circulating the obtained video signal, said another loop circuit subjecting the obtained video signal to said predetermined delay time and to another loop gain per one cycle and including another non-linear circuit for limiting the level of the obtained video signal.

* * * * *